US012664533B1

(12) United States Patent
Thompson et al.

(10) Patent No.: US 12,664,533 B1
(45) Date of Patent: Jun. 23, 2026

(54) BLOCKCHAIN-BASED PROPERTY OWNERSHIP TRACKING AND VERIFICATION

(71) Applicant: First American Title Company, Santa Ana, CA (US)

(72) Inventors: Nicole Leigh Thompson, Atlanta, GA (US); Todd Garrett Jones, Kansas City, KS (US); Jayson Eric Murray, Seattle, WA (US)

(73) Assignee: First American Title Company, Santa Ana, CA (US)

( * ) Notice: Subject to any disclaimer, the term of this patent is extended or adjusted under 35 U.S.C. 154(b) by 125 days.

(21) Appl. No.: 17/965,637

(22) Filed: Oct. 13, 2022

Related U.S. Application Data

(60) Provisional application No. 63/408,435, filed on Sep. 20, 2022.

(51) Int. Cl.
| | |
|---|---|
| *G06Q 20/12* | (2012.01) |
| *G06Q 20/36* | (2012.01) |
| *G06Q 20/38* | (2012.01) |

(52) U.S. Cl.
CPC ....... *G06Q 20/1235* (2013.01); *G06Q 20/367* (2013.01); *G06Q 20/3829* (2013.01); *G06Q 20/389* (2013.01); *G06Q 2220/00* (2013.01)

(58) Field of Classification Search
CPC ............. G06Q 20/1235; G06Q 20/367; G06Q 20/3829; G06Q 20/389; G06Q 2220/00
See application file for complete search history.

(56) References Cited

U.S. PATENT DOCUMENTS

| | | | | |
|---|---|---|---|---|
| 2017/0005804 | A1* | 1/2017 | Zinder ................. | H04L 9/3239 |
| 2019/0164223 | A1* | 5/2019 | de Jong .............. | G06Q 20/389 |
| 2019/0340623 | A1* | 11/2019 | Rivkind ................. | G06F 21/31 |
| 2020/0013075 | A1* | 1/2020 | Gilmore ............. | G06F 16/9535 |
| 2020/0074429 | A1* | 3/2020 | DeRosa-Grund .... | H04N 21/632 |
| 2020/0184431 | A1* | 6/2020 | Sinmao ............... | G06Q 20/389 |
| 2021/0201318 | A1* | 7/2021 | Wylie ....................... | H04L 9/50 |
| 2022/0118365 | A1* | 4/2022 | Thacker ................. | A63F 13/71 |
| 2022/0253958 | A1* | 8/2022 | Grobecker ............ | G06Q 10/40 |
| 2022/0374847 | A1* | 11/2022 | Livesay .............. | G06Q 20/223 |

(Continued)

FOREIGN PATENT DOCUMENTS

| | | | | |
|---|---|---|---|---|
| CN | 114978596 A | * | 8/2022 | ............. H04L 63/08 |

OTHER PUBLICATIONS

Valeria Lukaj, A Blockchain Based Federated Ecosystem for Tracking and Validating the Authenticity of Goods, Sep. 12, 2022, IEEE, https://ieeexplore.ieee.org/stamp/stamp.jsp?tp=&arnumber=9927982 (Year: 2022).*

*Primary Examiner* — Chunling Ding
(74) *Attorney, Agent, or Firm* — Knobbe Martens Olson & Bear LLP

(57) ABSTRACT

An improved blockchain network is described herein in which participants in the blockchain network can verify that a user has the right to transfer physical, real, or tangible property represented by a digital asset (e.g., a token, such as a non-fungible token) and implement the transfer. Thus, the improved blockchain network is more secure than typical blockchain implementations and improves the ability of participants in the blockchain network to identify and/or prevent malicious activity.

20 Claims, 7 Drawing Sheets

(56)  References Cited

U.S. PATENT DOCUMENTS

| | | | |
|---|---|---|---|
| 2023/0104103 A1* | 4/2023 | Eby | H04L 9/50 |
| | | | 705/69 |
| 2023/0161847 A1* | 5/2023 | Shida | H04L 9/3236 |
| | | | 726/26 |
| 2023/0267220 A1* | 8/2023 | El Khiyaoui | H04L 9/3252 |
| | | | 726/26 |
| 2024/0089104 A1* | 3/2024 | Reineke | H04L 9/50 |

* cited by examiner

*600*

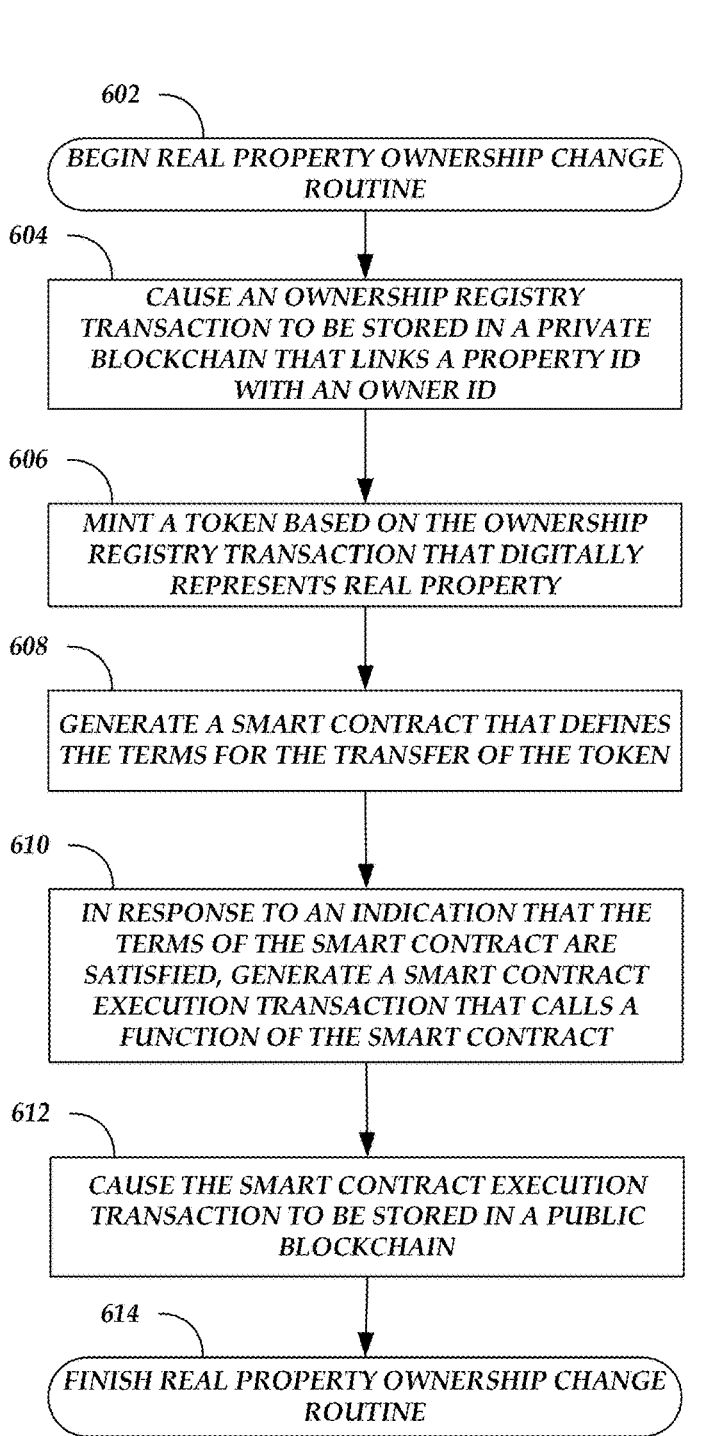

602

BEGIN REAL PROPERTY OWNERSHIP CHANGE ROUTINE

604

CAUSE AN OWNERSHIP REGISTRY TRANSACTION TO BE STORED IN A PRIVATE BLOCKCHAIN THAT LINKS A PROPERTY ID WITH AN OWNER ID

606

MINT A TOKEN BASED ON THE OWNERSHIP REGISTRY TRANSACTION THAT DIGITALLY REPRESENTS REAL PROPERTY

608

GENERATE A SMART CONTRACT THAT DEFINES THE TERMS FOR THE TRANSFER OF THE TOKEN

610

IN RESPONSE TO AN INDICATION THAT THE TERMS OF THE SMART CONTRACT ARE SATISFIED, GENERATE A SMART CONTRACT EXECUTION TRANSACTION THAT CALLS A FUNCTION OF THE SMART CONTRACT

612

CAUSE THE SMART CONTRACT EXECUTION TRANSACTION TO BE STORED IN A PUBLIC BLOCKCHAIN

614

FINISH REAL PROPERTY OWNERSHIP CHANGE ROUTINE

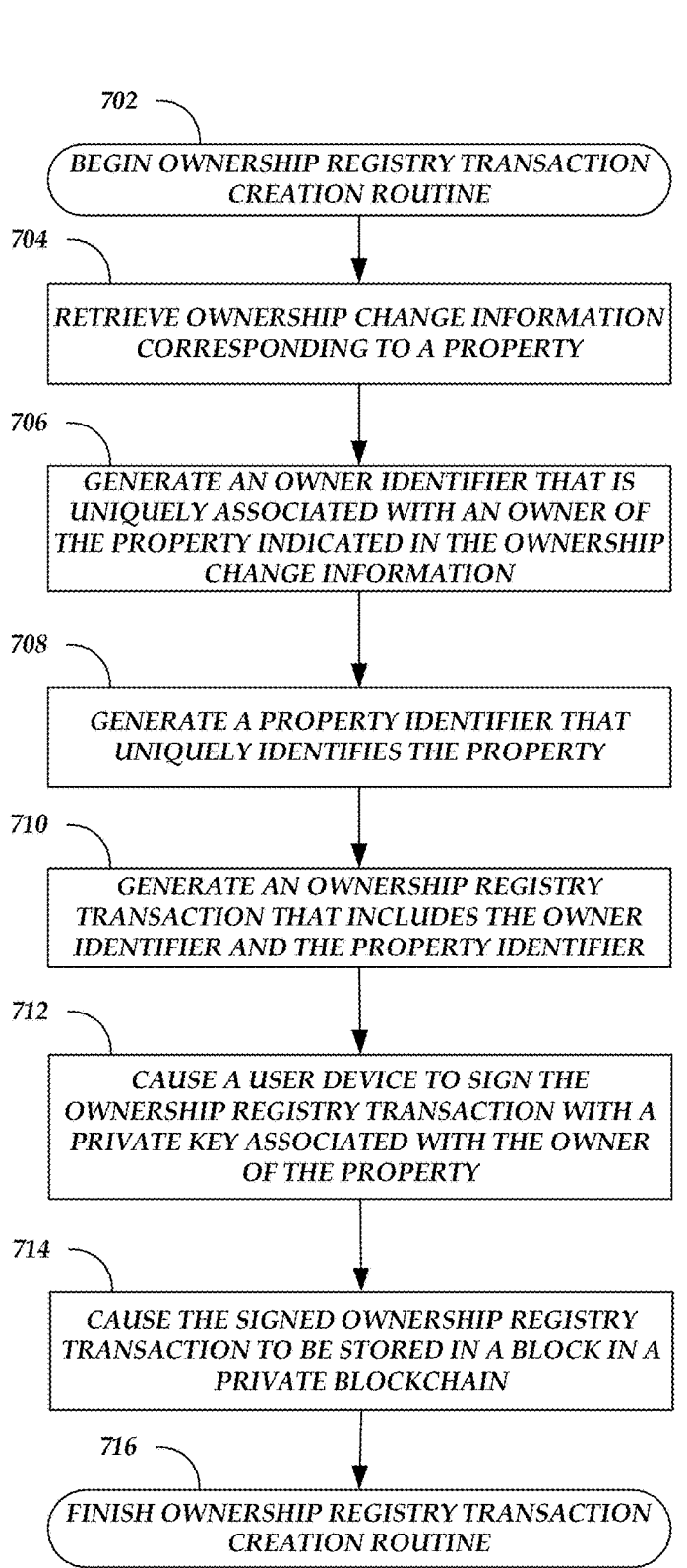

702

BEGIN OWNERSHIP REGISTRY TRANSACTION CREATION ROUTINE

704

RETRIEVE OWNERSHIP CHANGE INFORMATION CORRESPONDING TO A PROPERTY

706

GENERATE AN OWNER IDENTIFIER THAT IS UNIQUELY ASSOCIATED WITH AN OWNER OF THE PROPERTY INDICATED IN THE OWNERSHIP CHANGE INFORMATION

708

GENERATE A PROPERTY IDENTIFIER THAT UNIQUELY IDENTIFIES THE PROPERTY

710

GENERATE AN OWNERSHIP REGISTRY TRANSACTION THAT INCLUDES THE OWNER IDENTIFIER AND THE PROPERTY IDENTIFIER

712

CAUSE A USER DEVICE TO SIGN THE OWNERSHIP REGISTRY TRANSACTION WITH A PRIVATE KEY ASSOCIATED WITH THE OWNER OF THE PROPERTY

714

CAUSE THE SIGNED OWNERSHIP REGISTRY TRANSACTION TO BE STORED IN A BLOCK IN A PRIVATE BLOCKCHAIN

716

FINISH OWNERSHIP REGISTRY TRANSACTION CREATION ROUTINE

*Fig. 7*

BLOCKCHAIN-BASED PROPERTY OWNERSHIP TRACKING AND VERIFICATION

BACKGROUND

A blockchain is a distributed ledger that can be used to record transactions in a secure and reliable manner. Generally, a blockchain can be implemented within a peer-to-peer network. Computing devices participating in the peer-to-peer network can each include a copy of the blockchain and broadcast transactions to other computing devices participating in the peer-to-peer network.

The blockchain itself can include a chain of blocks that are linked together cryptographically, with each block in the chain storing one or more transactions and the number of blocks in the chain growing over time. For example, a transaction can include a data item, a call to a function of a smart contract, and/or any other type of exchange or event. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a computing device comprising: a hardware processor. The computing device further comprises a non-transitory computer readable storage medium storing program instructions for execution by the hardware processor in order to cause the computing device to: retrieve ownership change information corresponding to a property; generate an owner identifier that is uniquely associated with an owner of the property indicated in the ownership change information; generate a property identifier that uniquely identifies the property; generate an ownership registry transaction that includes the owner identifier and the property identifier; cause a user device to sign the ownership registry transaction with a private key associated with the owner of the property, wherein an original copy of the private key is stored in a user wallet associated with the owner of the property, and wherein a duplicate copy of the private key is stored in a private key data store of a digital rights management system; and cause the signed ownership registry transaction to be stored in a block in a private blockchain.

The computing device of the preceding paragraph can include any sub-combination of the following features: where the program instructions, when executed, further cause the computing device to generate a property rights identifier that uniquely identifies a property right associated with the property; where the program instructions, when executed, further cause the computing device to generate the ownership registry transaction to include the owner identifier, the property identifier, and the property rights identifier; where a token minted based on the ownership registry transaction digitally represents the property right associated with the property; where a smart contract defines terms for a transfer of the token from the owner to a new owner corresponding to a second owner identifier, and wherein execution of the smart contract causes the token to transfer to the new owner and represents a transfer of the property right from the owner to the new owner; where the program instructions, when executed, further cause the computing device to: generate a second ownership registry transaction that includes the owner identifier and the property identifier, cause the user device to sign the second ownership registry transaction with the private key associated with the owner of the property, and cause the signed second ownership registry transaction to be stored in a second block in the private blockchain, wherein a second token minted based on the second ownership registry transaction digitally represents the property, and wherein the owner owns the second token and the new owner owns the token at a same time; where the digital rights management system causes execution of the smart contract using the duplicate copy of the private key; where the property right comprises one of mineral rights in the property, advertisement rights in the property, a license for installation of infrastructure, a license for use of the infrastructure, a vehicle landing right in the property, a vehicle storage right in the property, an easement in the property, a variance in the property, a right of possession of the property, a right of exclusion on the property, a right of control on the property, a right to generate or derive income on the property, or a right of disposition of the property; where the program instructions, when executed, further cause the computing device to retrieve the ownership change information from a recorder data store associated with a jurisdiction; and where the property comprises one of a physical property, a tangible property, personal property, or real estate property.

Another aspect of the disclosure provides a computer-implemented method comprising: under control of a computing device, retrieving ownership change information corresponding to a property; generating an owner identifier that is uniquely associated with an owner of the property indicated in the ownership change information; generating a property identifier that uniquely identifies the property; generating an ownership registry transaction that includes the owner identifier and the property identifier; causing a user device to sign the ownership registry transaction with a private key associated with the owner of the property, wherein an original copy of the private key is stored in a user wallet associated with the owner of the property, and wherein a duplicate copy of the private key is stored in a private key data store of a digital rights management system; and causing the signed ownership registry transaction to be stored in a block in a private blockchain.

The computer-implemented method of the preceding paragraph can include any sub-combination of the following features: where the computer-implemented method further comprises generating a property rights identifier that uniquely identifies a property right associated with the property; where generating an ownership registry transaction further comprises generating the ownership registry transaction to include the owner identifier, the property identifier, and the property rights identifier; where a token minted based on the ownership registry transaction digitally represents the property right associated with the property; where a smart contract defines terms for a transfer of the token from the owner to a new owner corresponding to a second owner identifier, and wherein execution of the smart contract causes the token to transfer to the new owner and represents a transfer of the property right from the owner to the new owner; where the computer-implemented method further comprises generating a second ownership registry transaction that includes the owner identifier and the property identifier, causing the user device to sign the second ownership registry transaction with the private key associated with the owner of the property, and causing the signed second ownership registry transaction to be stored in a second block in the private blockchain, wherein a second token minted based on the second ownership registry transaction digitally represents the property, and wherein the owner owns the second token and the new owner owns the token at a same time; where the digital rights management system causes execution of the smart contract using the duplicate copy of the private key; where the property right comprises one of mineral rights in the property, advertisement rights in the property, a license for installation of infrastructure, a license for use of the infrastructure, a vehicle landing right in the property, a vehicle storage right in the property, an easement in the property, a variance in the property, a right of possession of the property, a right of exclusion on the property, a right of control on the property, a right to generate or derive income on the property, or a right of disposition of the property; and where the property comprises one of a physical property, a tangible property, personal property, or real estate property.

Another aspect of the disclosure provides non-transitory, computer-readable storage media comprising computer-executable instructions for digitally representing a property, wherein the computer-executable instructions, when executed by a computer system, cause the computer system to: retrieve ownership change information corresponding to the property; generate an owner identifier that is uniquely associated with an owner of the property indicated in the ownership change information; generate a property identifier that uniquely identifies the property; generate an ownership registry transaction that includes the owner identifier and the property identifier; cause a user device to sign the ownership registry transaction with a private key associated with the owner of the property, wherein an original copy of the private key is stored in a user wallet associated with the owner of the property, and wherein a duplicate copy of the private key is stored in a private key data store of a digital rights management system; and cause the signed ownership registry transaction to be stored in a block in a private blockchain.

Another aspect of the disclosure provides a computing device comprising a hardware processor. The computing device further comprises a non-transitory computer readable storage medium storing program instructions for execution by the hardware processor in order to cause the computing device to: obtain data corresponding to an ownership registry transaction stored in a private blockchain, wherein the ownership registry transaction comprises a property identifier linked to an owner identifier; mint a token based on the ownership registry transaction, wherein the token digitally represents a property corresponding to the property identifier; generate a smart contract that defines terms for a transfer of the token from a first entity corresponding to the owner identifier to a second entity corresponding to a second owner identifier; in response to an indication that the terms of the smart contract are satisfied, generate a smart contract execution transaction that calls a function of the smart contract; and cause the smart contract execution transaction to be stored in a public blockchain.

The computing device of the preceding paragraph can include any sub-combination of the following features: where the program instructions, when executed, further cause the computing device to update a recorder data store to indicate that the property is transferred from the first entity to the second entity; where the program instructions, when executed, further cause the computing device to cause a second ownership registry transaction to be stored in the private blockchain, wherein the second ownership registry transaction comprises the property identifier linked to the second owner identifier; where storage of the smart contract execution transaction in the public blockchain results in the token being transferred to the second entity; where storage of the smart contract execution transaction in the public blockchain results in the token being transferred from an address of a first user wallet associated with the first entity to an address of a second user wallet associated with the second entity; where the program instructions, when executed, further cause the computing device to: retrieve block data corresponding to the public blockchain, iterate through the block data to identify one or more transactions corresponding to the token, and verify that there are no competing property claims to the token based on the iteration through the block data; and where the program instructions, when executed, further cause the computing device to mint the token using the property identifier.

Another aspect of the disclosure provides a computer-implemented method comprising: under control of a computing device, obtaining data corresponding to an ownership registry transaction stored in a private blockchain, wherein the ownership registry transaction comprises a property identifier linked to an owner identifier; minting a token based on the ownership registry transaction, wherein the token digitally represents a property corresponding to the property identifier; generating a smart contract that defines terms for a transfer of the token from a first entity corresponding to the owner identifier to a second entity corresponding to a second owner identifier; in response to an indication that the terms of the smart contract are satisfied, generating a smart contract execution transaction that calls a function of the smart contract; and causing the smart contract execution transaction to be stored in a public blockchain.

The computer-implemented method of the preceding paragraph can include any sub-combination of the following features: where the computer-implemented method further comprises updating a recorder data store to indicate that the property is transferred from the first entity to the second entity; where the computer-implemented method further comprises causing a second ownership registry transaction to be stored in the private blockchain, wherein the second ownership registry transaction comprises the property identifier linked to the second owner identifier; where storage of the smart contract execution transaction in the public blockchain results in the token being transferred to the second entity; where storage of the smart contract execution transaction in the public blockchain results in the token being transferred from an address of a first user wallet associated with the first entity to an address of a second user wallet associated with the second entity; where the computer-implemented method further comprises: retrieving block data corresponding to the public blockchain; iterating through the block data to identify one or more transactions corresponding to the token; and verifying that there are no competing property claims to the token based on the iteration through the block data; and where minting a token further comprises minting the token using the property identifier.

Another aspect of the disclosure provides non-transitory, computer-readable storage media comprising computer-executable instructions for a transfer of property, wherein the computer-executable instructions, when executed by a computer system, cause the computer system to: obtain data corresponding to an ownership registry transaction stored in a private blockchain, wherein the ownership registry transaction comprises a property identifier linked to an owner identifier; mint a token based on the ownership registry transaction, wherein the token digitally represents a property corresponding to the property identifier; generate a smart contract that defines terms for a transfer of the token from a first entity corresponding to the owner identifier to a second entity corresponding to a second owner identifier; in response to an indication that the terms of the smart contract are satisfied, generate a smart contract execution transaction that calls a function of the smart contract; and cause the smart contract execution transaction to be stored in a public blockchain.

The non-transitory, computer-readable storage media of the preceding paragraph can include any sub-combination of the following features: where the computer-executable instructions further cause the computer system to update a recorder data store to indicate that the property is transferred from the first entity to the second entity; where the computer-executable instructions further cause the computer system to cause a second ownership registry transaction to be stored in the private blockchain, wherein the second ownership registry transaction comprises the property identifier linked to the second owner identifier; where storage of the smart contract execution transaction in the public blockchain results in the token being transferred to the second entity; where storage of the smart contract execution transaction in the public blockchain results in the token being transferred from an address of a first user wallet associated with the first entity to an address of a second user wallet associated with the second entity; and where the computer-executable instructions further cause the computer system to: retrieve block data corresponding to the public blockchain, iterate through the block data to identify one or more transactions corresponding to the token, and verify that there are no competing property claims to the token based on the iteration through the block data.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 6 is a flow diagram depicting a real property ownership change routine illustratively implemented by an ownership registry node, a miner device, and/or a digital rights management system, according to one embodiment.

FIG. 7 is a flow diagram depicting an ownership registry transaction creation routine 700 illustratively implemented by an ownership registry node, a miner device, and/or a digital rights management system, according to one embodiment.

DETAILED DESCRIPTION OF SPECIFIC EMBODIMENTS

Figure 1:
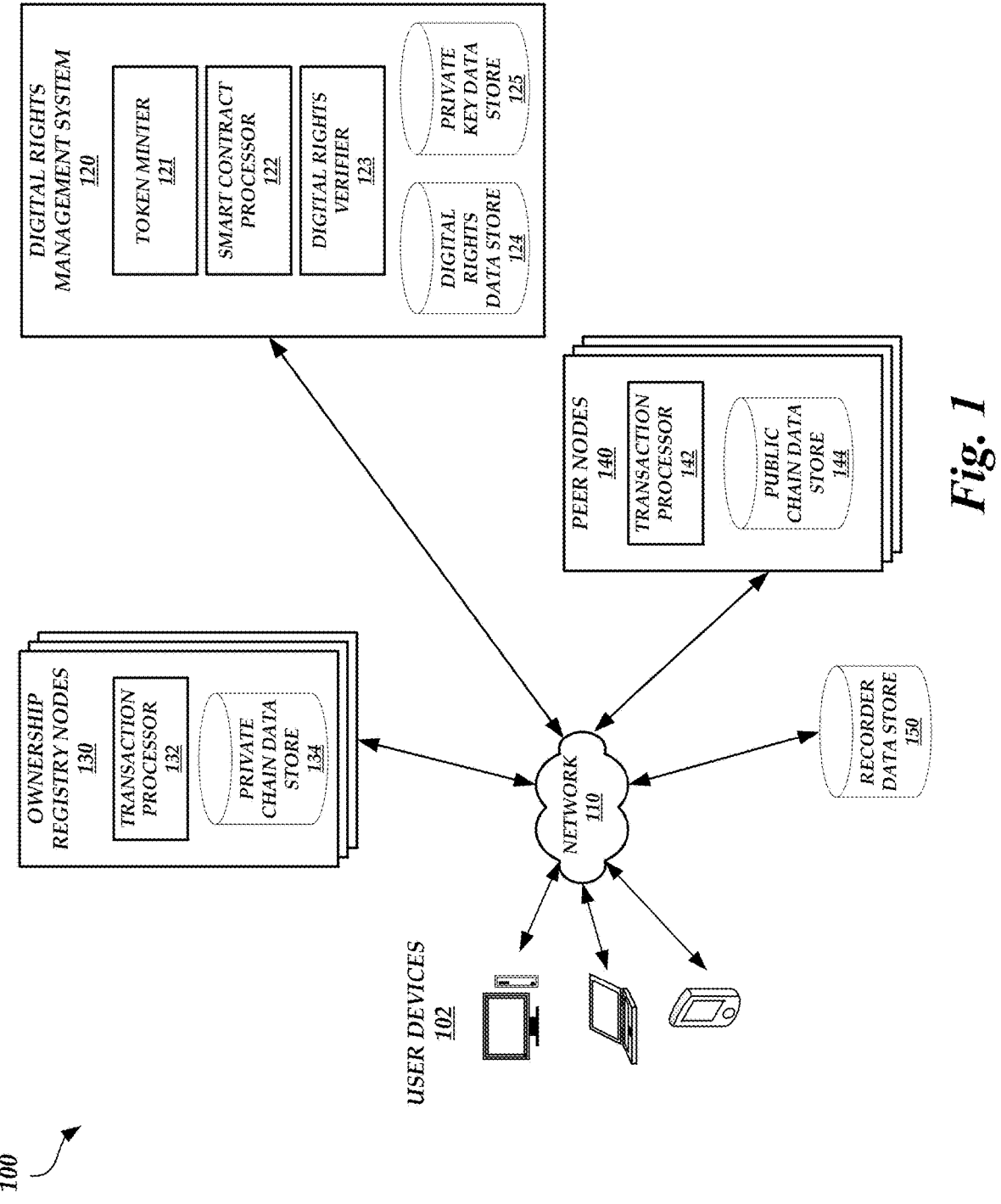
FIG. 1 is a block diagram of an illustrative operating environment in which an improved blockchain provides digital rights management to allow for the electronic transfer of ownership in real property.

As described above, a blockchain is a distributed ledger that can be used to record transactions. The blockchain includes a set of blocks that each store one or more transactions. For example, the transactions can be directed to the execution of smart contracts, the confirmation of ownership of a digital asset (e.g., a digital representation of physical, real, personal, or tangible property, which can include a controllable electronic record) by a particular entity, the transfer of a digital asset from one entity to another entity, and/or the like. In some cases, different transactions stored in the same or different blocks in the blockchain may be directed to the same digital asset (whether confirming ownership of the digital asset or indicating a transfer of the digital asset).

A typical blockchain implementation may implement a validation procedure to ensure that blocks are validated before being added to the blockchain, including blocks that each store transactions directed to the same digital asset. However, the typical blockchain implementation does not provide a mechanism to validate that specific transactions stored within various blocks in the blockchain collectively represent a chain of title of a digital asset that can be relied upon to, for example, validate a corresponding transfer of physical, real, or tangible property.

For example, in typical implementations, a user device can submit a transaction for storage in a block in the blockchain that indicates that a particular amount of cryptocurrency is being transferred from one from user to another user. It can be confirmed that the user has sufficient funds to make the transfer by various participants in the blockchain network, who may use an address associated with the user transferring the cryptocurrency and iterate backwards through previous transactions stored in prior blocks in the blockchain that indicate the flow of cryptocurrency from other addresses to the address associated with the user. Similarly, participants in the blockchain network could implement the same validation procedures to verify that a particular user owns or has access to a digital asset that is the subject of a transaction stored in a block in the blockchain. However, the participants in typical blockchain networks do not have any means for verifying that the user has the right to transfer physical, real, or tangible property represented by the digital asset, even if the transactions stored in the blockchain by themselves indicate that the user has rightfully obtained the digital asset.

Accordingly, described herein is an improved blockchain network in which participants in the blockchain network can verify that a user has the right to transfer physical, real, or tangible property represented by a digital asset (e.g., a token, such as a non-fungible token) and implement the transfer. Thus, the improved blockchain network is more secure than typical blockchain implementations and improves the ability of participants in the blockchain network to identify and/or prevent malicious activity.

For example, the improved blockchain network may incorporate both a private blockchain (e.g., a blockchain accessible to only certain user devices and/or to only those entities that have access to a particular private network) and a public blockchain (e.g., a blockchain accessible to user devices with access to a public network). The state of the private blockchain may be maintained by one or more ownership registry nodes, and transactions stored in blocks in the private blockchain may include data that links owners of properties (e.g., owner identifiers (IDs)) to the properties themselves (e.g., property IDs). The data stored in the private blockchain transactions may be derived from a data store maintained or provided by a particular jurisdiction (e.g., a county recorder's office, a state recorder's office, a municipal recorder's office, etc.) that tracks ownership, sales, easements, or other transfers of real property.

An owner of a property may have access to a user wallet or custodial wallet in which information related to the transactions stored in the private blockchain may be present. For example, the user wallet or custodial wallet of the owner of a property may include data that links the ID of the owner to the ID of the property owned by the owner. As described below, storing this data in the user wallet or custodial wallet may allow the owner to transfer ownership in the property to another user using a token.

A digital rights management system may enable the functionality that allows an owner to transfer ownership in a property to another user using a token. For example, the digital rights management system can, in response to a request by an owner, mint a token that digitally represents a property using data found in the owner's user wallet or custodial wallet and initially store the token in the owner's user wallet or custodial wallet. Having a token that digitally represents a property stored in a user wallet or custodial wallet may indicate that the entity that owns the user wallet or custodial wallet is the owner of the property. The owner can provide terms of a property transfer (e.g., what conditions should be met before the property is transferred to a new owner), and the digital rights management system can generate a smart contract that reflects the terms and cause the smart contract to be stored in a block in a public blockchain. In response to an indication that the terms of the property transfer are met, the digital rights management system can cause another transaction to be stored in a block in the blockchain that calls a function of the smart contract. For example, the function, when executed, may cause the token originally stored in the owner's user wallet or custodial wallet to be transferred to the new owner's user wallet or custodial wallet. Thus, calling the function of the smart contract may result in a digital confirmation that the property has been transferred to a new owner. In some instances, the digital rights management system can also update the data store maintained or provided by a particular jurisdiction that tracks sales, easements, or other transfers of real property to reflect the change in ownership such that jurisdictional records match records stored in the private and/or public blockchain.

As described above, the improved blockchain network described herein enables verification that a user has the right to transfer physical, real, or tangible property represented by a digital asset and implement the transfer. In particular, by using a private blockchain to store data linking an owner with a property and using this data to mint a token, the data used to mint the token may be restricted to certain, approved devices and systems. Thus, a malicious user may be prevented from spoofing an actual owner of a property, and minting a token directed to the actual owner's property and subsequently transferring the token to another user in a fraudulent transaction. In fact, using a token to digitally represent the property and storing transactions in blocks in the blockchain that indicate transfers of the token, the digital rights management system can also verify that an owner of a property has not "double spent" the token (e.g., transferred the same token to two different users). Accordingly, the features and operations described herein provide a technical benefit over typical blockchain networks.

While the present disclosure is directed to the transfer of real property, this is not meant to be limiting. The features and operations described herein can apply to the transfer, lease, assignment, lending, etc. of any type of physical, tangible, personal, or real property (also referred to herein as real estate property). In addition, the features and operations described herein can apply to the transfer, lease, assignment, lending, etc. of any property right (e.g., mineral rights, advertisement rights (e.g., billboards, augmented reality, virtual reality, etc.), licenses for installation and/or use of cell towers or other infrastructure, vehicle landing or storage rights, an easement, a variance, the right of possession, the right of exclusion, the right of control, the right to generate or derive income, the right of disposition, etc.) that is associated with any portion of physical, tangible, personal, or real property.

The foregoing aspects and many of the attendant advantages of this disclosure will become more readily appreciated as the same become better understood by reference to the following detailed description, when taken in conjunction with the accompanying drawings.

Example Improved Blockchain Environment

FIG. 1 is a block diagram of an illustrative operating environment 100 in which an improved blockchain provides digital rights management to allow for the electronic transfer of ownership in real property. As illustrated in FIG. 1, the operating environment 100 includes a digital rights management system 120, one or more ownership registry nodes 130, one or more peer nodes 140, a recorder data store 150, and one or more user devices 102 that may communicate via a network 110.

In general, a blockchain is a global append-only log. Writes to the global append-only log are called transactions, and transactions are organized into blocks. Thus, each block can include or package a single transaction or multiple transactions. Each block may be a data structure comprised of a block header and transaction data. The block header may include various data, such as a reference to the immediately preceding block in the blockchain (e.g., a reference to the parent of the block, where the reference may be a hash of the header of the immediately preceding block in the blockchain), a Merkle root (e.g., a hash of all the hashes of the transactions stored in the block), and/or a timestamp. The ownership registry nodes 130, the peer nodes 140, and/or miner devices (not shown) may implement a consensus protocol to determine a miner device that is authorized to write the next block in the blockchain.

The ownership registry node(s) 130 may represent physical or virtual computing devices acting as peers or nodes (e.g., devices that store an incomplete or complete copy of a blockchain and that can verify some or all transactions that have occurred since the genesis of the blockchain) in a decentralized network (e.g., a peer-to-peer network). In particular, the ownership registry node(s) 130 may act as peers or nodes for a private blockchain. The operating environment 100 may also include one or more miner devices (not shown) that may represent physical or virtual computing devices acting as miners (e.g., devices that form new blocks in a blockchain, where some of the devices may also store an incomplete or complete copy of the blockchain and/or obtain information about the blockchain from other ownership registry node(s) 130 and/or miner devices) in a decentralized network, such as in the private blockchain. The user device(s) 102 may represent physical or virtual computing devices (e.g., devices operated by users having a user or custodial wallet that stores cryptocurrency, linked property and owner data, other data related to real property, etc.) with access to the decentralized network (e.g., the private blockchain and/or the public blockchain described below) that can provide transactions (e.g., confirmation of ownership of real property, transfer of ownership of real property, distribution of a smart contract, execution of a smart contract, etc.) for processing and/or storage in the private and/or public blockchain. Each of the ownership registry node(s) 130, the miner device(s), and the user device(s) 102 may communicate with each other via the network 110 and/or via a private network access to which is restricted to certain devices and/or systems.

In general, the ownership registry node(s) 130, the miner device(s), and the user device(s) 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. As described in greater detail below, an ownership registry node 130 and/or a miner device can launch and execute one or more virtual machine (VM) instances, where each VM instance acts as a node in a decentralized network that implements the private blockchain described herein and can be associated with a user or participant. Thus, the terms "node" and "VM instance" can be used interchangeably.

In particular, each VM instance running on each ownership registry node 130 and/or miner device may store the same information, such as private blockchain block information (e.g., data identifying committed transactions (e.g., transactions stored therein), block header data, etc.). The VM instances (or computing devices) may store the same information because each VM instance (or computing device) may broadcast a message to one or more other VM instances (or one or more other computing devices) when the respective VM instance (or computing device) submits a transaction or receives a message indicating that a transaction has been submitted. For example, the VM instances (or computing devices) can communicate using a gossip protocol in which a VM instance (or computing device) forwards messages indicating that a transaction is submitted to its neighbor VM instances (or neighbor computing devices). Because each VM instance (or computing device) receives and stores the same transaction data, each VM instance (or computing device) has a copy of the same chain. The VM instances (or computing devices) can then independently perform the same operations to determine a miner device for the next block in the private blockchain, track linked property and owner data stored in transactions, and/or the like.

An ownership registry node 130 or miner device can launch and execute a VM instance as a standalone application. Alternatively, an ownership registry node 130 or miner device can run an application within which the VM instance is launched and executed. For example, the application can be a mobile application.

The VM instance running on each ownership registry node 130 may include a transaction processor 132 and/or a private chain data store 134. The transaction processor 132 can broadcast and/or receive various messages indicating that a transaction has been stored or executed. For example, the transaction processor 132 can broadcast that an ownership registry node 130 has submitted an ownership registry transaction, that a miner device has submitted an ownership registry transaction, that a user device 102 has submitted an ownership registry transaction, and/or the like. An ownership registry transaction may be a data structure that links an owner ID (or a set of owner IDs if multiple individuals or entities collectively own a particular real property) that uniquely represents an owner of a particular real property with a property ID that uniquely represents the real property owned by the owner. An ownership registry transaction can also be a data structure that links an owner ID that uniquely represents an owner of a right in a particular real property with a property ID that uniquely represents the real property in which the owner owns a right, and a property rights ID that uniquely represents the right owned by the owner in real property (whether or not the owner of the right is the same as the owner of the real property). Furthermore, in the case of a fractional ownership of a right in a particular real property, an ownership registry transaction can be a data structure that links a set of owner IDs (one for each individual or entity that owns a fractional interest in the right) that each uniquely represent a fractional owner of a right in a particular real property with a property ID that uniquely represents the real property in which the owners own a right, and a property rights ID that uniquely represents the right owned by the owners in real property (whether or not the owners of the right are the same as the owner(s) of the real property). In other words, the ownership registry transaction may be a data structure that identifies the owner or owners of real property at a certain point in time or the owner or owners of a right in real property at a certain point in time. Thus, there may be multiple ownership registry transactions corresponding to the same real property that may be considered current, where each ownership registry transaction may correspond to the ownership of a particular right in real property or the real property itself.

The private chain data store 134 can store private blockchain block data. For example, the private chain data store 134 can store an indication of one or more transactions stored in one or more blocks in the private blockchain, optionally including an indication of a device or node that submitted a transaction, a time that the transaction was submitted to the private blockchain, and/or the like. Thus, the private chain data store 134 may store an incomplete or complete state of the private blockchain. The transaction processor 132 can update the private chain data store 134 each time a new transaction is received via the network from one or more other ownership registry nodes 130, miner devices, and/or user devices 102. While the private chain data store 134 is depicted as being internal to the ownership registry node 130, this is not meant to be limiting. For example, the private chain data store 134 may reside internal to a VM instance of the ownership registry node 130, internal to the ownership registry node 130 and external to a VM instance of the ownership registry node 130, and/or external to the ownership registry node 130.

The peer node(s) 140 may represent physical or virtual computing devices acting as peers or nodes (e.g., devices that store an incomplete or complete copy of a blockchain and that can verify some or all transactions that have occurred since the genesis of the blockchain) in a decentralized network (e.g., a peer-to-peer network). In particular, the peer node(s) 140 may act as peers or nodes for a public blockchain, such as Bitcoin, Ethereum, and/or the like. The operating environment 100 may also include one or more miner devices (not shown) that may represent physical or virtual computing devices acting as miners (e.g., devices that form new blocks in a blockchain, where some of the devices may also store an incomplete or complete copy of the blockchain and/or obtain information about the blockchain from other peer node(s) 140 and/or miner devices) in a decentralized network, such as in the public blockchain. The user device(s) 102 may represent physical or virtual computing devices (e.g., devices operated by users having a user or custodial wallet that stores cryptocurrency, linked property and owner data, other data related to real property, etc.) with access to the decentralized network (e.g., the private blockchain and/or the public blockchain described below) that can provide transactions (e.g., confirmation of ownership of real property, transfer of ownership of real property, distribution of a smart contract, execution of a smart contract, etc.) for processing and/or storage in the private and/or public blockchain. Each of the peer node(s) 140, the miner device(s), and the user device(s) 102 may communicate with each other via the network 110.

In general, the peer node(s) 140, the miner device(s), and the user device(s) 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. As described in greater detail below, a peer node 140 and/or a miner device can launch and execute one or more virtual machine (VM) instances, where each VM instance acts as a node in a decentralized network that implements the public blockchain described herein and can be associated with a user or participant. Thus, the terms "node" and "VM instance" can be used interchangeably.

In particular, each VM instance running on each peer node 140 and/or miner device may store the same information, such as public blockchain block information (e.g., data identifying committed transactions (e.g., transactions stored therein), block header data, etc.). The VM instances (or computing devices) may store the same information because each VM instance (or computing device) may broadcast a message to one or more other VM instances (or one or more other computing devices) when the respective VM instance (or computing device) submits a transaction or receives a message indicating that a transaction has been submitted. For example, the VM instances (or computing devices) can communicate using a gossip protocol in which a VM instance (or computing device) forwards messages indicating that a transaction is submitted to its neighbor VM instances (or neighbor computing devices). Because each VM instance (or computing device) receives and stores the same transaction data, each VM instance (or computing device) has a copy of the same chain. The VM instances (or computing devices) can then independently perform the same operations to determine a miner device for the next block in the public blockchain, track tokens referenced in transactions, track changes in token ownership indicated in transactions, and/or the like.

A peer node 140 or miner device can launch and execute a VM instance as a standalone application. Alternatively, a peer node 140 or miner device can run an application within which the VM instance is launched and executed. For example, the application can be a mobile application.

The VM instance running on each peer node 140 may include a transaction processor 142 and/or a public chain data store 144. The transaction processor 142 can broadcast and/or receive various messages indicating that a transaction has been stored or executed. For example, the transaction processor 142 can broadcast that a peer node 140 has submitted a digital rights transaction or a smart contract execution transaction, that a miner device has submitted a digital rights transaction or a smart contract execution transaction, that a user device 102 has submitted a digital rights transaction or a smart contract execution transaction, and/or the like. A digital rights transaction may be a data structure that includes a smart contract, where the smart contract may include one or more public functions that can be called by a subsequent transaction. A smart contract execution transaction may be a data structure that includes a call to a public function included in a smart contract included in a transaction previously stored in a block in the public blockchain. Calling the public function of the smart contract may, for example, result in an execution of the terms of the smart contract (e.g., a transfer of a token from one user to another user).

The public chain data store 144 can store public blockchain block data. For example, the public chain data store 144 can store an indication of one or more transactions stored in one or more blocks in the public blockchain, optionally including an indication of a device or node that submitted a transaction, a time that the transaction was submitted to the public blockchain, and/or the like. Thus, the public chain data store 144 may store an incomplete or complete state of the public blockchain. The transaction processor 142 can update the public chain data store 144 each time a new transaction is received via the network from one or more other peer nodes 140, miner devices, and/or user devices 102. While the public chain data store 144 is depicted as being internal to the peer node 140, this is not meant to be limiting. For example, the public chain data store 144 may reside internal to a VM instance of the peer node 140, internal to the peer node 140 and external to a VM instance of the peer node 140, and/or external to the peer node 140.

The digital rights management system 120 can be a computing system configured to mint tokens that digitally represent real property or a right associated with real property, generate smart contracts that define the terms for transferring minted tokens, and/or verify token transfers. The digital rights management system 120 may be a single computing device, or it may include multiple distinct computing devices, such as computer servers, logically or physically grouped together to collectively operate as a server system. The components of the digital rights management system 120 can each be implemented in application-specific hardware (e.g., a server computing device with one or more ASICs) such that no software is necessary, or as a combination of hardware and software. In addition, the modules and components of the digital rights management system 120 can be combined on one server computing device or separated individually or into groups on several server computing devices. In some embodiments, the digital rights management system 120 may include additional or fewer components than illustrated in FIG. 1.

In some embodiments, the features and services provided by the digital rights management system 120 may be implemented as web services consumable via the communication network 110. In further embodiments, the digital rights management system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The digital rights management system 120 may include various components to implement the functionality described herein. For example, the digital rights management system 120 may include a token minter 121, a smart contract processor 122, a digital rights verifier 123, a digital rights data store 124, and/or a private key data store 125.

The token minter 121 may be configured to mint or generate a token that digitally represents a particular real property or a particular right associated with a particular real property. For example, a particular real property may be associated with a unique property ID (e.g., that may be derived based on a legal description of the real property) that, together with an owner ID that uniquely identifies an owner of the real property, is stored in a transaction in a block in the private blockchain. In the example of a token that represents a particular right associated with a particular real property, the particular right may be associated with a unique property rights ID that is associated with the property ID of the real property, where the unique property rights ID (and property rights IDs unique to other rights associated with the real property) and the property ID may together with an owner ID uniquely identify an owner of a right of the real property and where the unique property rights ID(s), the property ID, and the owner ID can be stored in a transaction in a block in the private blockchain. The transaction may be signed (e.g., encrypted) with a private key associated with the owner of the real property and that is stored in the user or custodial wallet of the owner of the real property. The token minter 121 (and the digital rights management system 120 generally) may have access to both the ownership registry node(s) 130 and the peer node(s) 140, and therefore access to both the private blockchain and the public blockchain. In response to a request to mint a token that digitally represents a real property associated with a particular property ID, the token minter 121 can identify an owner ID linked to the property ID from a transaction stored in the private blockchain (e.g., via communication with an ownership registry node 130), can generate a data structure that includes the property ID and/or other data corresponding to the real property (e.g., a number of bedrooms on the real property, a geographic location of the real property, etc.), and use a private key stored in the user or custodial wallet of the owner corresponding to the owner ID to sign the data structure to form a minted token. The token minter 121 can then store the minted token in the user or custodial wallet from which the private key is obtained, update the digital rights data store 124 to include the minted token and/or to store information identifying current ownership of the minted token (e.g., an address of a user or custodial wallet in which the minted token is stored), generate and transmit a transaction to a peer node 140 or miner device for inclusion in a block in the public blockchain that indicates a current ownership of the minted token (e.g., an address of a user or custodial wallet in which the minted token is stored), and/or the like.

In response to a request to mint a token that digitally represents a right in a real property associated with a particular property ID, the token minter 121 can identify an owner ID linked to the property ID from a transaction stored in the private blockchain (e.g., via communication with an ownership registry node 130), can generate a data structure that includes the property rights ID, the property ID, and/or other data corresponding to the real property (e.g., a number of bedrooms on the real property, a geographic location of the real property, etc.), and use a private key stored in the user or custodial wallet of the owner corresponding to the owner ID to sign the data structure to form a minted token.

The token minter 121 can then store the minted token in the user or custodial wallet from which the private key is obtained, update the digital rights data store 124 to include the minted token and/or to store information identifying current ownership of the minted token (e.g., an address of a user or custodial wallet in which the minted token is stored), generate and transmit a transaction to a peer node 140 or miner device for inclusion in a block in the public blockchain that indicates a current ownership of the minted token (e.g., an address of a user or custodial wallet in which the minted token is stored), and/or the like. Thus, a separate transaction may be stored in the public blockchain for each minted token associated with real property, whether the minted token is a primary token or a secondary token.

If the token minter 121 generates multiple tokens for a real property, where one token corresponds to ownership of the real property itself and the other token(s) correspond to specific rights in the real property, then the token corresponding to ownership of the real property may be referred to herein as a primary token and the token(s) corresponding to specific rights in the real property may be referred to herein as secondary token(s). The token minter 121 can generate any number of secondary tokens for a particular real property (e.g., 0, 1, 2, 3, 4, 5, etc.), where each secondary token corresponds to a different right in the real property. In some instances, secondary token(s) may be linked to a primary token such that the transfer of a primary token to one party also results in the transfer of all of the linked secondary tokens to the same party. In other instances, while secondary token(s) may be linked to a primary token, the transfer of a primary token to one party may not necessarily result in the transfer of some or all of the linked secondary tokens to the same party. In either scenario, a secondary token can be transferred from one party to another party without a primary token also being transferred in the same transaction.

Optionally, the digital rights management system 120 may have access to some or all of the private keys stored in the user or custodial wallets to provide management services. For example, the digital rights management system 120 may store a separate, duplicate copy of some or all of the private keys in the private key data store 125 such that a private key can be returned to a user if the user loses access to the user or custodial wallet, if a hardware failure causes a user to lose the private key, to be used as collateral (e.g., for a loan or other debt), and/or the like. The digital rights management system 120 may also have access to some or all of the private keys to initiate a transfer of a token from the current owner to a new party if the current owner is not physically able to initiate the transfer, if the transfer is ordered by a court or other judicial entity, and/or the like. For example, the digital rights management system 120 can instruct the token minter 121, the smart contract processor 122, and/or the digital rights verifier 123 to perform some or all of the operations described herein to initiate the transfer of a token, using the duplicate copy of the private key provided by the private key data store 125 in place of the original copy of the private key stored in a custodial or user wallet to sign the digital rights transaction and/or the smart contract execution transaction. In addition, the digital rights management system 120 can instruct the transaction processor 132 to generate an ownership registry transaction that reflects the new owner of the property following the token transfer.

The smart contract processor 122 may be configured to generate a smart contract based on terms or other conditions provided by a user device 102. For example, a user device 102 may provide the terms or conditions that govern when a real property is to be transferred from a current owner to a new owner. Transfer of the real property may include transfer of one or more tokens that each digitally represent the real property or a right in the real property from a user or custodial wallet of a current owner to a user or custodial wallet of a new owner. The smart contract processor 122 can generate one or more lines of source code incorporated into one or more functions that collectively represent the smart contract, where one or more of the functions, when executed, carry out the terms or conditions provided by the user device 102.

As an illustrative example, the terms or conditions provided by a user device 102 may indicate an address of a user or custodial wallet of a current owner, an address of a user or custodial wallet of a new owner, an identification of a particular minted token corresponding to a particular real property, and one or more conditions that, when satisfied, should result in the transfer of a minted token corresponding to a particular real property from the user or custodial wallet of the current owner to the user or custodial wallet of the new owner. The corresponding source code generated by the smart contract processor 122 may be included in one or more functions that can be called by a transaction stored in a block in the public blockchain. The source code, when executed, may cause the identified minted token to be transferred from the address of a user or custodial wallet of the current owner to the address of a user or custodial wallet of the new owner. The smart contract processor 122 can provide a user device 102 with information indicating which function(s) to call to execute a transfer of the minted token. When a user device 102 receives information indicating that the stated conditions have been satisfied, the user device 102 can request that the smart contract processor 122 call the indicated function(s). In response, the smart contract processor 122 can request the transaction processor 142 to generate and broadcast a transaction that calls the indicated function(s). Once a miner device incorporates the transaction in a block in the public blockchain, the indicated function(s) may be executed and the public chain data store 144 and/or the digital rights data store 124 may be updated to reflect the transfer of the minted token.

As described above, the transfer of a primary token that digitally represents a real property can also include a transfer of some or all of the secondary tokens that digitally represent a right associated with the real property. For example, the smart contract processor 122 may be configured to generate a smart contract based on terms or other conditions provided by a user device 102 that, in addition to the above, indicate whether the transfer of a token that digitally represents a real property (e.g., a primary token) will also include the transfer of some or all of the tokens that digitally represent a right associated with the real property (e.g., secondary token(s)). The smart contract processor 122 can generate one or more lines of source code incorporated into one or more functions that collectively represent the smart contract, where one or more of the functions, when executed, carry out the terms or conditions provided by the user device 102. As an illustrative example, the terms or conditions provided by a user device 102 may indicate an address of a user or custodial wallet of a current owner, an address of a user or custodial wallet of a new owner, an identification of a particular minted token corresponding to a particular real property, an identification of one or more other minted tokens that each correspond to a particular right in the particular real property (e.g., mineral rights, advertisement rights, vehicle landing or storage rights, etc.), and one or more conditions that, when satisfied, should result in the transfer of a minted token corresponding to a particular real property and other minted token(s) that each correspond to a particular right from the user or custodial wallet of the current owner to the user or custodial wallet of the new owner. The corresponding source code generated by the smart contract processor 122 may be included in one or more functions that can be called by a transaction stored in a block in the public blockchain. The source code, when executed, may cause the identified minted tokens to be transferred from the address of a user or custodial wallet of the current owner to the address of a user or custodial wallet of the new owner. The smart contract processor 122 can provide a user device 102 with information indicating which function(s) to call to execute a transfer of the minted tokens. When a user device 102 receives information indicating that the stated conditions have been satisfied, the user device 102 can request that the smart contract processor 122 call the indicated function(s). In response, the smart contract processor 122 can request the transaction processor 142 to generate and broadcast a transaction that calls the indicated function(s). Once a miner device incorporates the transaction in a block in the public blockchain, the indicated function(s) may be executed and the public chain data store 144 and/or the digital rights data store 124 may be updated to reflect the transfer of the minted tokens.

The terms and conditions used by the smart contract processor 122 to generate a smart contract can also indicate the transfer of a secondary token from a current owner to a new owner without any further transfer of a primary token corresponding to the real property. In fact, neither the current owner nor the new owner of the secondary token may necessarily be the same entity as the current owner of the primary token. In other words, a primary token corresponding to a real property and a second token corresponding to a right in the real property do not necessarily have to be owned by the same party. Depending on the terms and conditions provided by a user device 102, however, the transfer of a primary token from a current owner to a new owner may include the transfer of a secondary token from a current owner to the new owner, even if the current owners of the primary and secondary tokens are different. As used herein, any reference to a minted token can refer to a primary token, a secondary token, multiple secondary tokens, or a combination of a primary token and one or more secondary tokens.

The digital rights verifier 123 may be configured to verify that the transfer of a minted token is valid and authorized. For example, each minted token corresponding to a particular real property may be unique. The digital rights verifier 123 can communicate with the public chain data store 144 to obtain block data for the public blockchain, which includes data indicating one or more transactions to which a particular minted token is a subject. The digital rights verifier 123 can parse these transactions, iterating backwards (or forwards) through the public blockchain, to determine a transfer history of the minted token. Specifically, the digital rights verifier 123 may analyze the transfer history to determine whether the minted token was improperly transferred from one user or custodial wallet to two or more different user or custodial wallets and/or whether the minted token has already been transferred to another user or custodial wallet (e.g., the user or custodial wallet that is initiating the transfer to another user or custodial wallet does not have actual possession of the minted token). If the digital rights verifier 123 identifies a discrepancy in the transfer history of the minted token, the digital rights verifier 123 can inform the smart contract processor 122 such that the smart contract processor 122 does not initiate submission of a transaction that calls a function of the smart contract to transfer the minted token, can generate an alert or notification for transmission to a user device 102 associated with the potential new owner of the real property indicating a problem with the real property and/or minted token transfer, and/or otherwise flag for an appropriate party or device (e.g., a device or system associated with a lender that is to provide funds to the new owner) that there is an issue with the transfer of the real property so that appropriate action can be taken and/or the sale or transfer of the real property can be stopped before the sale or transfer is completed.

While the digital rights verifier 123 is depicted as being internal to the digital rights management system 120, this is not meant to be limiting. For example, the digital rights verifier 123 can be a separate physical system or set of computing devices located external to the digital rights management system 120.

The digital rights data store 124 may store minted tokens and/or information indicating a current storage location of one or more minted tokens. As described herein, the minted tokens can include primary tokens and/or secondary tokens. The digital rights data store 124 may indicate which tokens are linked to a particular real property or right in a real property and/or the current owners of the tokens (e.g., an address of a user wallet that stores a token, an owner ID, etc.). For example, in association with a particular property ID, the digital rights data store 124 may list one or more minted tokens that correspond to the respective property ID (e.g., primary and secondary tokens that are minted using the respective property ID) and/or an owner of these minted tokens, thereby creating a linkage between primary and secondary tokens. While the digital rights data store 124 is depicted as being internal to the digital rights management system 120, this is not meant to be limiting. The digital rights data store 124 may be located external to the digital rights management system 120.

The private key data store 125 may store copies of private keys that are stored in custodial or user wallets of various users, such as users that have or will participate in the transfer of a right in real property or the real property itself. When setting up a custodial or user wallet, the user may grant the digital rights management system 120 access to the custodial or user wallet for the purpose of storing a duplicate copy of the private key stored in the custodial or user wallet. Thus, the private key data store 125 may serve as a centralized storage medium for one or more private keys that are used to sign blockchain transactions. While the private key data store 125 is depicted as being internal to the digital rights management system 120, this is not meant to be limiting. The private key data store 125 may be located external to the digital rights management system 120.

The recorder data store 150 may store jurisdictional records (e.g., county records, state records, municipal records, etc.) that indicate the grantor(s) and grantee(s) of real property transfers, parties to an easement corresponding to a real property, and/or any other relevant information directed to the ownership and/or rights to real property. The recorder data store 150 may be managed by a jurisdictional entity (e.g., a county, a state, a city, etc.). The operating environment 100 may include one or more recorder data stores 150, where each recorder data store 150 may be managed by a different jurisdictional entity.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

While not shown, a user device 102 can include a VM instance that includes some or all of the same components and functionality as the VM instance of an ownership registry node 130, a peer node 140, or a miner device. A user device 102 can therefore perform some or all of the same functionality as a peer and/or a miner.

Example Ownership Registry Transaction

Figure 2:
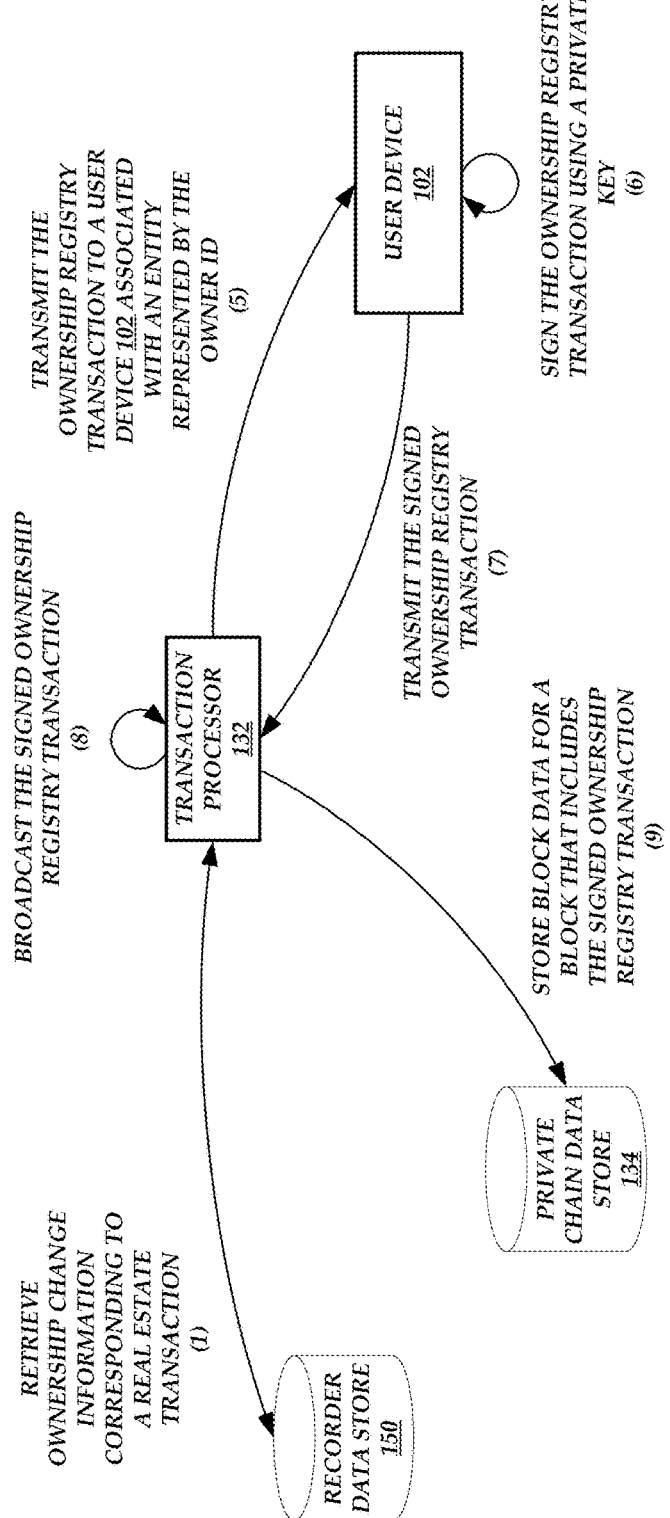
FIG. 2 is a flow diagram illustrating the operations performed by the components of the operating environment to generate and submit an ownership registry transaction.

FIG. 2 is a flow diagram illustrating the operations performed by the components of the operating environment 100 to generate and submit an ownership registry transaction. As illustrated in FIG. 2, the transaction processor 132 retrieves from the recorder data store 150 ownership change information corresponding to a real estate transaction (e.g., a sale, transfer, lease, easement, and/or the like corresponding to a particular real property) at (1). The transaction processor 132 may retrieve ownership change information from the recorder data store 150 periodically, in response to a notification from the recorder data store 150 that its records have been updated, in response to a request from a user device 102, in response to an indication (e.g., from the token minter 121, the smart contract processor 122, the transaction processor 142, etc.) that a token corresponding to a particular real property is scheduled to be used in a future real estate transaction, and/or the like.

The transaction processor 132 can generate an owner ID for an entity (e.g., individual, group of individuals, corporation, non-profit organization, government agency, etc.) that is a party to the real estate transaction at (2), if an owner ID has not already been generated for the entity. For example, the transaction processor 132 can parse the ownership change information (e.g., which can include the legal description of the property) and identify parties to the transaction (e.g., grantor(s), grantee(s), lessor(s), lessee(s), rights holder(s), party granted right(s) to at least a portion of the real property, etc.). For each party, the transaction processor 132 can determine whether an owner ID has already been generated for the respective party (e.g., by querying a local data store and/or a data store dedicated to storing owner IDs and corresponding information identifying the entities associated with each owner ID). If an owner ID has not already been generated for the respective party, then the transaction processor 132 can generate the owner ID and store the owner ID locally and/or in the data store dedicated to storing owner IDs (e.g., the digital rights data store 124). The generated owner ID may be an ID that is unique to the party.

The transaction processor 132 can also generate a property ID for a property (e.g., that is subject to the real estate transaction) at (3), if a property ID has not already been generated for the property. For example, the transaction processor 132 can parse the ownership change information and identify the real property that is the subject of the ownership change. The transaction processor 132 can determine whether a property ID has already been generated for the real property (e.g., by querying a local data store and/or a data store dedicated to storing property IDs and corresponding information identifying the real property associated with each property ID). If a property ID has not already been generated for the real property, then the transaction processor 132 can generate the property ID and store the property ID locally and/or in the data store dedicated to storing property IDs (e.g., the digital rights data store 124). The property ID may be an ID that is unique to the real property. The transaction processor 132 may generate the property ID based on specific information associated with the real property, such as the number of bedrooms, the geographic location at which the real property is located, the legal description, the address of the real property, and/or the like. For example, the transaction processor 132 may generate the property ID by taking a hash of some or all of the specific information associated with the real property.

Optionally, the transaction processor 132 can generate a property rights ID for a right in a property, if a property rights ID has not already been generated for the right in the property. For example, the transaction processor 132 can parse the ownership change information and identify a right in the real property that is the subject of the ownership change. The transaction processor 132 can determine whether a property rights ID has already been generated for the real property (e.g., by querying a local data store and/or a data store dedicated to storing property rights IDs). If a property rights ID has not already been generated for the right in the real property, then the transaction processor 132 can generate the property rights ID and store the property rights ID locally and/or in the data store dedicated to storing property rights IDs (e.g., the digital rights data store 124). The property rights ID may be an ID that is unique to the specific right in the real property and to the real property itself. The transaction processor 132 may generate the property rights ID based on specific information associated with the right in the real property, such as the name of the right, the timeframe during which the right is granted, the legal description of the right and/or real property, the address of the real property, and/or the like. For example, the transaction processor 132 may generate the property rights ID by taking a hash of some or all of the specific information associated with the right in the real property.

While the generation of the owner ID, the property ID, and the property rights ID are described herein in association with a real estate transaction, this is not meant to be limiting. For example, the transaction processor 132 can generate an owner ID, a property ID, and/or a property rights ID in a manner as described herein regardless of whether the subject property is being transferred or a right in the subject property is being transferred. In particular, the transaction processor 132 can generate one or more of the IDs using ownership change information corresponding to a previous transaction involving a property.

The transaction processor 132 can then generate an ownership registry transaction at (4) that includes the owner ID and the property ID. Thus, the ownership registry transaction may link the owner ID and the property ID, thereby indicating a current owner of a real property. The transaction processor 132 can transmit the ownership registry transaction to a user device 102 associated with an entity represented by the owner ID at (5).

The user device 102, which may have access to the entity's user or custodial wallet, may sign the ownership registry transaction at (6) using a private key associated with the entity and stored in the entity's user or custodial wallet. For example, the user device 102 can encrypt the ownership registry transaction using the private key to form the signed ownership registry transaction. The user device 102 can transmit the signed ownership registry transaction to the transaction processor 132 at (7). Alternatively, the transaction processor 132 can sign the ownership registry transaction instead of the user device 102.

The transaction processor 132 can broadcast the signed ownership registry transaction at (8), which may cause the signed ownership registry transaction to propagate to other ownership registry nodes 130 and/or miner devices that participate in the private blockchain. A miner device may eventually aggregate one or more transactions, including the signed ownership registry transaction, and store the transaction(s) in a block in the private blockchain. The miner device may broadcast to other participants in the private blockchain that this action has occurred, and the transaction processor 132 can update its current state of the private blockchain by storing block data for the block that includes the signed ownership registry transaction in the private chain data store 134 at (9).

Example Digital Rights Transaction

Figure 3:
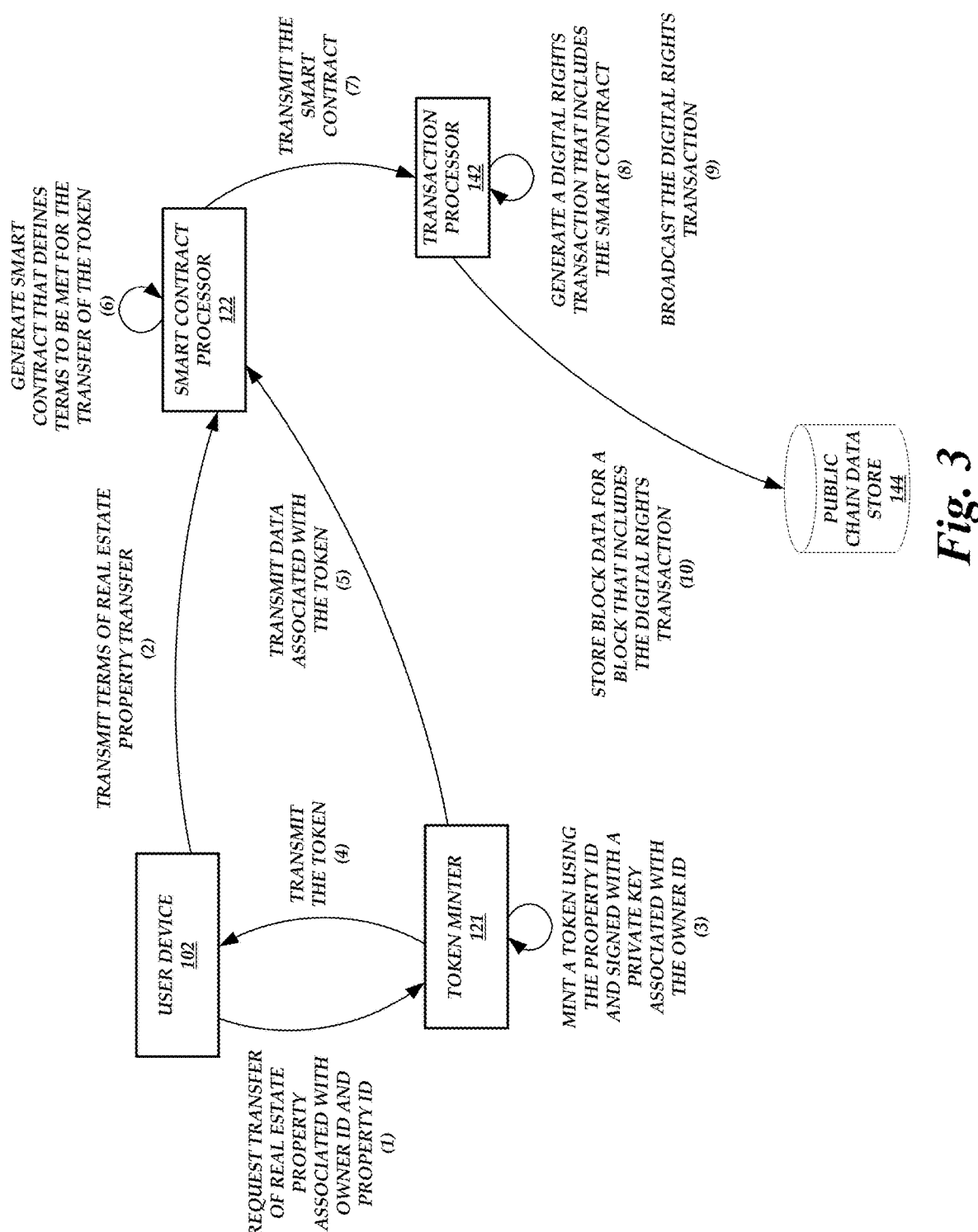
FIG. 3 is a flow diagram illustrating the operations performed by the components of the operating environment to generate and submit a digital rights transaction.

FIG. 3 is a flow diagram illustrating the operations performed by the components of the operating environment 100 to generate and submit a digital rights transaction. As illustrated in FIG. 3, a user device 102 requests from the token minter 121 the transfer of real estate property associated with an owner ID and property ID at (1). For example, the user device 102 may inform the token minter 121 that a transfer of real property is to take place and provide information that can be used to mint a token corresponding to the real property or a right in the real property, if a token for the real property has not already been generated. Before, during, and/or after sending the request to the token minter 121, the user device 102 can transmit the terms (and/or conditions) of the real estate property transfer to the smart contract processor 122 at (2).

The token minter 121 can mint a token using the property ID (or property rights ID) and signed with a private key associated with the owner ID at (3), if a token for the real property has not already been minted. For example, the token minter 121 can query the digital rights data store 124 to determine whether a token corresponding to the property ID (or property rights ID) provided by the user device 102 has already been minted. If a token for the real property has already been minted, then the token minter 121 can skip operations (3) and (4). If the token minter 121 mints the token, then the token minter 121 can transmit the minted token to the user device 102 at (4). The token minter 121 may also transmit data associated with the token to the smart contract processor 122 at (5). For example, the data may indicate a storage location of the token (e.g., an address of a user or custodial wallet in which the token is stored).

Optionally, the token minter 121 (or the smart contract processor 122 and/or transaction processor 142) can verify that the owner ID provided by the user device 102 corresponds to the current owner of the real estate property (or the current owner of the right in the real estate property) that is the subject of the transfer prior to a token being minted, a smart contract being generated, a digital rights transaction being generated, and/or the digital rights transaction being broadcast to other peer nodes 140. For example, the token minter 121 (or the smart contract processor 122 and/or transaction processor 142) can request the transaction processor 132 to query the recorder data store 150 and retrieve the most recent ownership change information stored therein corresponding to the real estate property (or right in the real estate property) that is the subject of the transfer. In response, the transaction processor 132 can retrieve the most recent ownership change information, parse the most recent ownership change information and identify parties to the transaction (e.g., grantor(s), grantee(s), lessor(s), lessee(s), rights holder(s), party granted right(s) to at least a portion of the real property, etc.), determine a current owner or owners of the real estate property (or of the right in the real estate property) based on the identified parties, query a local data store and/or a data store dedicated to storing owner IDs using the name(s) of the current owner, and return the owner ID returned by the local data store and/or the data store dedicated to storing owner IDs to the token minter 121 (or the smart contract processor 122 and/or transaction processor 142). The token minter 121 (or the smart contract processor 122 and/or transaction processor 142) can then determine whether the owner ID returned by the transaction processor 132 matches the owner ID provided by the user device 102. If the owner IDs match, the operations may continue as described herein. However, if the owner IDs do not match, then the minting of the token, the generation of the smart contract, the generation of the digital rights transaction, and/or the broadcasting of the digital rights transaction may be prevented from being completed.

Furthermore, the transaction processor 132 may query the state of the private blockchain stored in the private chain data store 134 to determine whether the owner ID returned by the local data store and/or the data store dedicated to storing owner IDs is included with a property ID corresponding to the real estate property (or a property rights ID corresponding to a right in the real estate property) that is the subject of the transfer in an ownership registry transaction stored on the private blockchain. If the owner ID is not included with the property ID of the real estate property (or with the property rights ID of the right in the real estate property) that is the subject of the transfer in an ownership registry transaction, then the transaction processor 132 and/or a user device 102 may perform some or all of the operations described above with respect to FIG. 2 such that an ownership registry transaction that includes the owner ID and the property ID of the real estate property (or the property rights ID of the right in the real estate property) that is the subject of the transfer is stored in a block in the private blockchain.

The smart contract processor 122 can generate a smart contract that defines terms to be met for the transfer of the token at (6). For example, the smart contract may include one or more functions that, when called, cause the token to be transferred from one user or custodial wallet to another user or custodial wallet. The smart contract processor 122 can transmit the smart contract to the transaction processor 142 at (7).

The transaction processor 142 can generate a digital rights transaction that includes the smart contract at (8). For example, the digital rights transaction may include the source code of the generated smart contract. The digital rights transaction may be signed by the user device 102 with a private key associated with the owner corresponding to the owner ID that is transferring the property (or the right in the property). The transaction processor 142 can broadcast the digital rights transaction at (9), which may cause other peer nodes 140 to receive the digital rights transaction. A miner device may eventually aggregate one or more transactions, including the digital rights transaction, and store the transaction(s) in a block in the public blockchain. The miner device may broadcast to other participants in the public blockchain that this action has occurred, and the transaction processor 142 can update its current state of the public blockchain by storing block data for the block that includes the digital rights transaction in the public chain data store 144 at (10).

Example Smart Contract Execution Transaction

Figure 4:
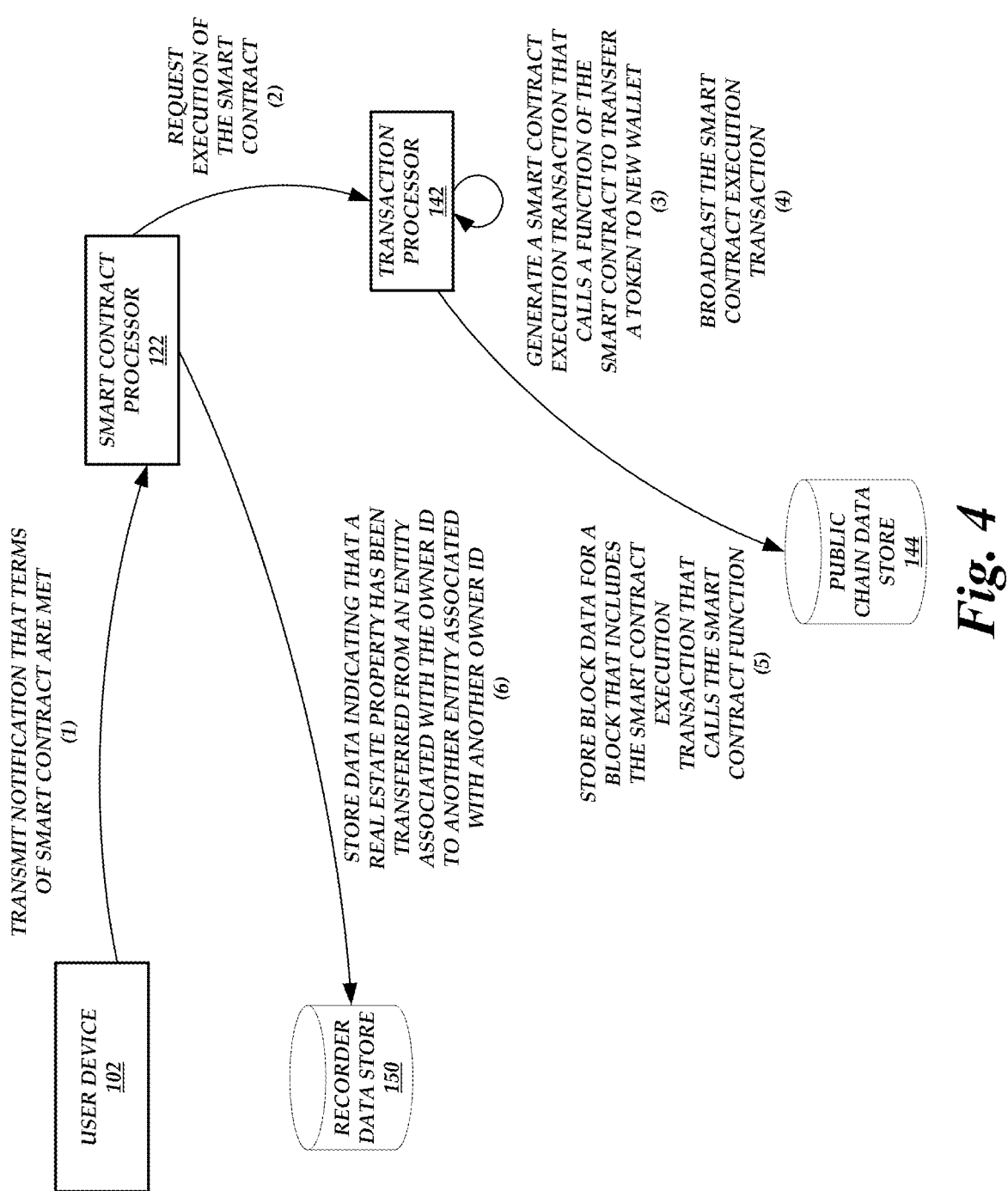
FIG. 4 is a flow diagram illustrating the operations performed by the components of the operating environment to generate and submit a smart contract execution transaction.

FIG. 4 is a flow diagram illustrating the operations performed by the components of the operating environment 100 to generate and submit a smart contract execution transaction. As illustrated in FIG. 4, a user device 102 transmits to the smart contract processor 122 at (1) a notification that terms of a previously generated smart contract have been met. In response, the smart contract processor 122 can request the transaction processor 142 to execute the smart contract at (2).

The smart contract processor 122 can generate a smart contract execution transaction that calls a function of the smart contract to transfer a token to a new wallet at (3). The smart contract execution transaction may be signed by the user device 102 with a private key associated with the owner corresponding to the owner ID that is transferring the property. The smart contract processor 122 can broadcast the smart contract execution transaction at (4), which may cause the smart contract execution transaction to propagate to other peer nodes 140 and/or miner devices that participate in the public blockchain. A miner device may eventually aggregate one or more transactions, including the smart contract execution transaction, and store the transaction(s) in a block in the public blockchain. The miner device may broadcast to other participants in the public blockchain that this action has occurred, and the transaction processor 142 can update its current state of the public blockchain by storing block data for the block that includes the smart contract execution transaction in the public chain data store 144 at (5).

Optionally, the smart contract processor 122 can be notified that the public blockchain has been updated to include the smart contract execution transaction and/or can monitor the public blockchain to determine that the smart contract execution transaction has been submitted, and can store data in the recorder data store 150 indicating that a real estate property has been transferred from an entity associated with the owner ID to another entity associated with another owner ID at (6), as indicated in the executed smart contract. For example, the smart contract processor 122 may update the recorder data store 150 corresponding to the jurisdiction in which the real property subject to the transfer is located. Optionally, not shown, the smart contract processor 122 can cause the transaction processor 132 to generate and broadcast a new ownership registry transaction to reflect the transfer of the ownership of the real property, in a manner as described herein. For example, the new ownership registry transaction may link the property ID with an owner ID corresponding to the new owner of the real property. Broadcasting the new ownership registry transaction may result in the private blockchain being updated to include a new block that includes the new ownership registry transaction.

Example Digital Rights Verification

Figure 5:
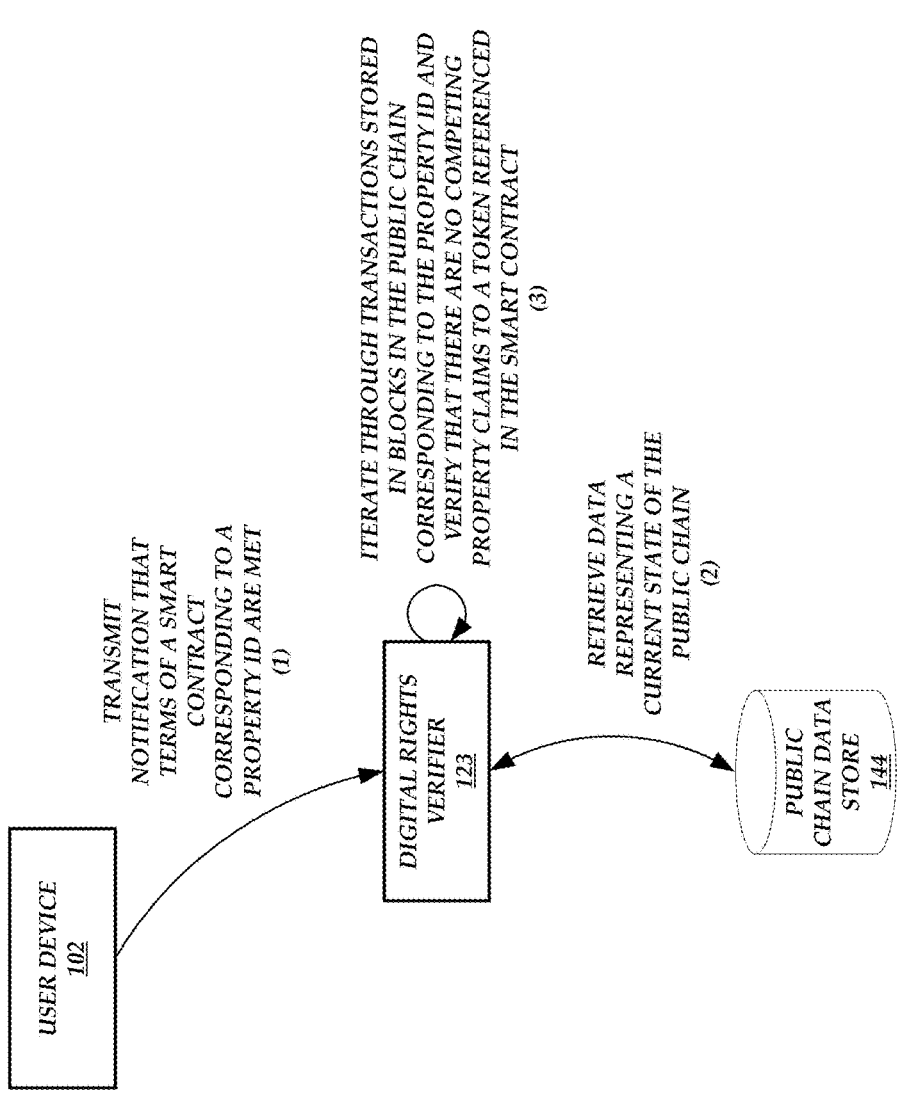
FIG. 5 is a flow diagram illustrating the operations performed by the components of the operating environment to verify that an entity is authorized to transfer a minted token.

FIG. 5 is a flow diagram illustrating the operations performed by the components of the operating environment 100 to verify that an entity is authorized to transfer a minted token. As illustrated in FIG. 5, a user device 102 can transmit a notification to the digital rights verifier 123 that the terms of a smart contract corresponding to a property ID (e.g., corresponding to a real property) (or corresponding to a property rights ID) have been met at (1). Alternatively or in addition, the user device 102 or the smart contract processor 122 can transmit a notification to the digital rights verifier 123 indicating that a smart contract defining the terms of a transfer in ownership of real property has been generated and/or stored in the public blockchain.

The digital rights verifier 123 can retrieve from the public chain data store 144 data representing a current state of the public chain at (2). For example, the retrieved data may include block data for the public blockchain, such as the transactions stored in each block in the public blockchain, header data of blocks in the public blockchain, and/or the like. Optionally, the digital rights verifier 123 can publish the retrieved data, such as to a user device 102, to another blockchain, to a data store (which optionally is publicly-accessible), to a separate computing system (not shown), on a content page (e.g., a network page, a web page, etc.), and/or the like.

The digital rights verifier 123 can then iterate through transactions stored in blocks in the public chain (e.g., from most recent to least recent blocks, from least recent blocks to most recent blocks, etc.), identifying those transactions that correspond to the provided property ID (e.g., those transactions directed to a token associated with the provided property ID) (or that correspond to the provided property rights ID), and verifying that there are no competing property claims to a token associated with the provided property ID (or property rights ID) that is referenced in the smart contract at (3). For example, the digital rights verifier 123 can verify that there are no competing property claims to a token if there is a clear chain of title from an original holder of the token to the party that is transferring the token to a new party in a manner as defined in the smart contract. If the digital rights verifier 123 cannot verify that there are no competing property claims to the token, then the digital rights verifier 123 may generate an alert or notification to the appropriate party notifying the party of the discrepancy, may halt or prevent the transfer or the token (e.g., halt or prevent execution of the smart contract), and/or the like.

In further embodiments, the digital rights verifier 123 can perform a read-only verification that there are no competing property claims to a token associated with a particular real estate property. For example, a user (e.g., a real estate broker, an escrow service, a party to a transaction, etc.) using a user device 102 may request the digital rights verifier 123 to verify the ownership of a token corresponding to a property ID (or property rights ID, legal description of a real estate property, etc.) identified in the request. The user may request verification to determine whether the purported owner of a real estate property (or right in real estate property) actually owns the property (or right) and/or has the right to transfer ownership in the real estate property or a right associated with the real estate property to another party. This read-only verification can be initiated by a user device 102 regardless of whether a token, real estate property, or right in real estate property is being transferred.

Upon receiving the request, the digital rights verifier 123 can retrieve from the public chain data store 144 data representing a current state of the public chain. For example, the retrieved data may include block data for the public blockchain, such as the transactions stored in each block in the public blockchain, header data of blocks in the public blockchain, and/or the like. The digital rights verifier 123 can then iterate through transactions stored in blocks in the public chain (e.g., from most recent to least recent blocks, from least recent blocks to most recent blocks, etc.), identifying those transactions that correspond to the provided property ID (e.g., those transactions directed to a token associated with the provided property ID) or property rights ID, and verifying that there are no competing property claims to a token associated with the provided property ID or property rights ID that is referenced in the smart contract. For example, the digital rights verifier 123 can verify that there are no competing property claims to a token if there is a clear chain of title from an original holder of the token to the party that is purporting to be a current owner of the token. As an added verification step, the digital rights verifier 123 can request the transaction processor 132 to retrieve from the private chain data store 134 data representing a current state of the private chain and to determine whether the most recent ownership registry transaction stored in the private chain that includes the provided property ID or property rights ID includes a link between the property ID (or property rights ID) and an owner ID corresponding to the purported owner of the token.

If the digital rights verifier 123 cannot verify that there are no competing property claims to the token (e.g., based on a discrepancy in the chain of title in the pubic blockchain or the transaction processor 132 indicating to the digital rights verifier 123 that the owner ID in the most recent ownership registry transaction that includes the provided property ID (or property rights ID) does not match an owner ID of the purported owner of the token), then the digital rights verifier 123 may generate an alert or notification, informing the user device 102 of the discrepancy. Otherwise, if the digital rights verifier 123 identifies a clear chain of title from the original holder of the token to the party that is purporting to be a current owner of the token and/or the transaction processor 132 indicates to the digital rights verifier 123 that the owner ID in the most recent ownership registry transaction that includes the provided property ID (or property rights ID) matches an owner ID of the purported owner of the token, then the digital rights verifier 123 can generate an alert or notification, informing the user device 102 that the verification has passed successfully.

Example Real Property Ownership Change Routine

FIG. 6 is a flow diagram depicting a real property ownership change routine 600 illustratively implemented by an ownership registry node, a miner device, and/or a digital rights management system, according to one embodiment. As an example, the ownership registry node 130, a miner device, and/or the digital rights management system 120 of FIG. 1 can be configured to execute the real property ownership change routine 600. The real property ownership change routine 600 begins at block 602.

At block 604, an ownership registry transaction is caused to be stored in a private blockchain. The ownership registry transaction may link a property ID associated with a real property with an owner ID associated with an owner of the real property.

At block 606, a token is minted based on the ownership registry transaction. The token may digitally represent the real property associated with the property ID included in the ownership registry transaction. The token can be minted after the ownership registry transaction is stored and/or in response to an indication that the real property is to be transferred to a new owner.

At block 608, a smart contract that defines the terms for the transfer of the token is generated. Transfer of the token may represent digitally a change in the ownership of the real property. In some instances, ownership of the token may provide legal rights in the ownership of the real property.

At block 610, in response to an indication that the terms of the smart contract are satisfied, a smart contract execution transaction is generated that calls a function of the smart contract. The function, when called and executed, may cause the token to be transferred from one user or custodial wallet to another user or custodial wallet.

At block 612, the smart contract execution transaction is caused to be stored in a public blockchain. Storage of the smart contract execution transaction may cause the token to be transferred, and thereby ownership of the real property to be transferred to a new owner. After the smart contract execution transaction is caused to be stored in the public blockchain, the real property ownership change routine 600 finishes, as indicated at block 614.

Fewer, more, or different blocks can be used as part of the routine 600. In some cases, one or more blocks can be omitted. Furthermore, it will be understood that the various blocks described herein with reference to FIG. 6 can be implemented in a variety of orders, or can be performed concurrently.

Example Ownership Registry Transaction Creation Routine

FIG. 7 is a flow diagram depicting an ownership registry transaction creation routine 700 illustratively implemented by an ownership registry node, a miner device, and/or a digital rights management system, according to one embodiment. As an example, the ownership registry node 130, a miner device, and/or the digital rights management system 120 of FIG. 1 can be configured to execute the ownership registry transaction creation routine 700. The ownership registry transaction creation routine 700 begins at block 702.

At block 704, ownership change information corresponding to a property is retrieved. For example, the ownership change information can be retrieved from a data store maintained by a recorder in a particular jurisdiction. The ownership change information may identify a property, parties to a transaction associated with the property, and/or the like.

At block 706, an owner identifier that is uniquely associated with an owner of the property indicated in the ownership change information is generated. For example, the owner identifier may be generated if an owner identifier does not already exist for the owner of the property indicated in the ownership change information.

At block 708, a property identifier that uniquely identifies the property is generated. For example, the property identifier may be generated if a property identifier does not already exist for the property indicated in the ownership change information. Optionally, one or more property rights identifiers can be generated for the property that are each associated with a particular right in the property.

at block 710, an ownership registry transaction that includes the owner identifier and the property identifier is generated. For example, the ownership registry transaction may link the owner identifier with the property identifier. Optionally, the ownership registry transaction also includes one or more property rights identifiers.

At block 712, a user device is caused to sign the ownership registry transaction with a private key associated with the owner of the property. An original copy of the private key may be stored in a user wallet associated with the owner of the property, and a duplicate copy of the private key may be stored in a private key data store or a digital rights management system (e.g., the digital rights management system 120).

At block 714, the signed ownership registry transaction is caused to be stored in a block in a private blockchain. After the signed ownership registry transaction is caused to be stored, the ownership registry transaction creation routine 700 finishes, as indicated at block 716.

Fewer, more, or different blocks can be used as part of the routine 700. In some cases, one or more blocks can be omitted. Furthermore, it will be understood that the various blocks described herein with reference to FIG. 7 can be implemented in a variety of orders, or can be performed concurrently.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might." "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computing device comprising:
a hardware processor; and
a non-transitory computer readable storage medium storing program instructions for execution by the hardware processor in order to cause the computing device to:
retrieve ownership change information corresponding to a property;
generate an owner identifier that is uniquely associated with an owner of the property indicated in the ownership change information;
generate a property identifier that uniquely identifies the property;
generate an ownership registry transaction that includes the owner identifier and the property identifier;
cause a user device to sign the ownership registry transaction with a private key associated with the owner of the property that is obtained from a user wallet associated with the owner of the property, wherein an original copy of the private key is stored in the user wallet associated with the owner of the property, and wherein a duplicate copy of the private key is stored in a private key data store of a digital rights management system separate from the user wallet;
cause the signed ownership registry transaction to be stored in a block in a private blockchain; and
in response to a term of a smart contract stored in a second transaction in a public blockchain separate from the private blockchain being satisfied,
cause a smart contract execution transaction to be stored in a second block in the public blockchain, wherein the smart contract execution transaction includes a call to a function included in the smart contract stored in the second transaction in the public blockchain that results in execution of the term of the smart contract, and
cause a second ownership registry transaction to be stored in a third block in the private blockchain that indicates a transfer of the property from the owner to a second owner.

2. The computing device of claim 1, wherein the program instructions, when executed, further cause the computing device to generate a property rights identifier that uniquely identifies a property right associated with the property.

3. The computing device of claim 2, wherein the program instructions, when executed, further cause the computing device to generate the ownership registry transaction to include the owner identifier, the property identifier, and the property rights identifier.

4. The computing device of claim 3, wherein a token minted based on the ownership registry transaction digitally represents the property right associated with the property.

5. The computing device of claim 4, wherein the smart contract defines terms for a transfer of the token from the owner to a new owner corresponding to a second owner identifier, and wherein execution of the smart contract causes the token to transfer to the new owner and represents a transfer of the property right from the owner to the new owner.

6. The computing device of claim 5, wherein the program instructions, when executed, further cause the computing device to:

generate the second ownership registry transaction that includes the owner identifier and the property identifier;

cause the user device to sign the second ownership registry transaction with the private key associated with the owner of the property; and cause the signed second ownership registry transaction to be stored in the third block in the private blockchain, wherein a second token minted based on the second ownership registry transaction digitally represents the property, and wherein the owner owns the second token and the new owner owns the token at a same time.

7. The computing device of claim 5, wherein the digital rights management system causes execution of the smart contract using the duplicate copy of the private key.

8. The computing device of claim 2, wherein the property right comprises one of mineral rights in the property, advertisement rights in the property, a license for installation of infrastructure, a license for use of the infrastructure, a vehicle landing right in the property, a vehicle storage right in the property, an easement in the property, a variance in the property, a right of possession of the property, a right of exclusion on the property, a right of control on the property, a right to generate or derive income on the property, or a right of disposition of the property.

9. The computing device of claim 1, wherein the program instructions, when executed, further cause the computing device to retrieve the ownership change information from a recorder data store associated with a jurisdiction.

10. The computing device of claim 1, wherein the property comprises one of a physical property, a tangible property, personal property, or real estate property.

11. A computer-implemented method comprising:

retrieving, by a computing device, ownership change information corresponding to a property;

generating, by the computing device, an owner identifier that is uniquely associated with an owner of the property indicated in the ownership change information;

generating, by the computing device, a property identifier that uniquely identifies the property;

generating, by the computing device, an ownership registry transaction that includes the owner identifier and the property identifier;

causing, by the computing device, a user device to sign the ownership registry transaction with a private key associated with the owner of the property that is obtained from a user wallet associated with the owner of the property, wherein an original copy of the private key is stored in a user wallet associated with the owner of the property, and wherein a duplicate copy of the private key is stored in a private key data store of a digital rights management system separate from the user wallet;

causing, by the computing device, the signed ownership registry transaction to be stored in a block in a private blockchain; and in response to a term of a smart contract stored in a second transaction in a public blockchain separate from the private blockchain being satisfied, causing, by the computing device, a smart contract execution transaction to be stored in a second block in the public blockchain, wherein the smart contract execution transaction includes a call to a function included in the smart contract stored in the second transaction in the public blockchain that results in execution of the term of the smart contract, and causing, by the computing device, a second ownership registry transaction to be stored in a third block in the private blockchain that indicates a transfer of the property from the owner to a second owner.

12. The computer-implemented method of claim 11, further comprising generating a property rights identifier that uniquely identifies a property right associated with the property.

13. The computer-implemented method of claim 12, wherein generating an ownership registry transaction further comprises generating the ownership registry transaction to include the owner identifier, the property identifier, and the property rights identifier.

14. The computer-implemented method of claim 13, wherein a token minted based on the ownership registry transaction digitally represents the property right associated with the property.

15. The computer-implemented method of claim 14, wherein the smart contract defines terms for a transfer of the token from the owner to a new owner corresponding to a second owner identifier, and wherein execution of the smart contract causes the token to transfer to the new owner and represents a transfer of the property right from the owner to the new owner.

16. The computer-implemented method of claim 15, further comprises:

generating the second ownership registry transaction that includes the owner identifier and the property identifier;

causing the user device to sign the second ownership registry transaction with the private key associated with the owner of the property; and causing the signed second ownership registry transaction to be stored in the third block in the private blockchain, wherein a second token minted based on the second ownership registry transaction digitally represents the property, and wherein the owner owns the second token and the new owner owns the token at a same time.

17. The computer-implemented method of claim 15, wherein the digital rights management system causes execution of the smart contract using the duplicate copy of the private key.

18. The computer-implemented method of claim 12, wherein the property right comprises one of mineral rights in the property, advertisement rights in the property, a license for installation of infrastructure, a license for use of the infrastructure, a vehicle landing right in the property, a vehicle storage right in the property, an easement in the property, a variance in the property, a right of possession of the property, a right of exclusion on the property, a right of control on the property, a right to generate or derive income on the property, or a right of disposition of the property.

19. The computer-implemented method of claim 11, wherein the property comprises one of a physical property, a tangible property, personal property, or real estate property.

20. Non-transitory, computer-readable storage media comprising computer-executable instructions for digitally representing a property, wherein the computer-executable instructions, when executed by a computer system, cause the computer system to:

retrieve ownership change information corresponding to the property;

generate an owner identifier that is uniquely associated with an owner of the property indicated in the ownership change information;

generate a property identifier that uniquely identifies the property;

generate an ownership registry transaction that includes the owner identifier and the property identifier;

cause a user device to sign the ownership registry transaction with a private key associated with the owner of the property that is obtained from a user wallet associated with the owner of the property, wherein an original copy of the private key is stored in a user wallet associated with the owner of the property, and wherein a duplicate copy of the private key is stored in a private key data store of a digital rights management system separate from the user wallet;

cause the signed ownership registry transaction to be stored in a block in a private blockchain; and in response to a term of a smart contract stored in a second transaction in a public blockchain separate from the private blockchain being satisfied, cause a smart contract execution transaction to be stored in a second block in the public blockchain, wherein the smart contract execution transaction includes a call to a function included in the smart contract stored in the second transaction in the public blockchain that results in execution of the term of the smart contract, and cause a second ownership registry transaction to be stored in a third block in the private blockchain that indicates a transfer of the property from the owner to a second owner.

\* \* \* \* \*